(12) United States Patent
Crouch-Baker et al.

(10) Patent No.: US 10,246,785 B2
(45) Date of Patent: *Apr. 2, 2019

(54) USE OF FLUIDIZED-BED ELECTRODE REACTORS FOR ALANE PRODUCTION

(71) Applicant: Ardica Technologies, Inc., San Francisco, CA (US)

(72) Inventors: Steven Crouch-Baker, Palo Alto, CA (US); Mark A. Petrie, Santa Clara, CA (US); David Stout, Palo Alto, CA (US); Francis Tanzella, San Carlos, CA (US)

(73) Assignee: Ardica Technologies, Inc., San Francisco, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 14/986,921

(22) Filed: Jan. 4, 2016

(65) Prior Publication Data
US 2016/0115602 A1    Apr. 28, 2016

Related U.S. Application Data

(63) Continuation-in-part of application No. 13/671,122, filed on Nov. 7, 2012, now Pat. No. 9,228,267.
(Continued)

(51) Int. Cl.
| | |
|---|---|
| *C25B 9/16* | (2006.01) |
| *C25B 11/02* | (2006.01) |
| *C25B 11/04* | (2006.01) |
| *C25B 13/00* | (2006.01) |
| *C25B 1/00* | (2006.01) |

(Continued)

(52) U.S. Cl.
CPC ............... *C25B 9/162* (2013.01); *C01B 6/06* (2013.01); *C25B 1/00* (2013.01); *C25B 11/02* (2013.01); *C25B 11/0415* (2013.01); *C25B 13/00* (2013.01); *C25B 15/08* (2013.01)

(58) Field of Classification Search
None
See application file for complete search history.

(56) References Cited

U.S. PATENT DOCUMENTS

| | | | |
|---|---|---|---|
| 3,032,037 A | 5/1962 | Huber | |
| 3,129,163 A | 4/1964 | Stern et al. | |

(Continued)

FOREIGN PATENT DOCUMENTS

| | | |
|---|---|---|
| DE | 10392795 T5 | 6/2005 |
| GB | 833646 A | 4/1960 |

(Continued)

OTHER PUBLICATIONS

Petrie et al., "Synthesis of Microcrystalline Alpha Alane," Utility U.S. Appl. No. 13/671,090, filed Nov. 7, 2012. 16 pages.
(Continued)

*Primary Examiner* — Eli S Mekhlin
(74) *Attorney, Agent, or Firm* — Carr & Ferrell LLP

(57) ABSTRACT

Fluidized-bed reactors for producing alane are provided herein. An exemplary process includes inducing an electrical potential difference in an electrolyte solution to produce an anolyte solution that includes an alane adduct, wherein an electrical potential difference is generated between anode aluminum particles and a cathode, the electrolyte solution including an alkali metal hydride dissolved in a solvent, the anode aluminum particles and cathode being separated by a diaphragm.

20 Claims, 1 Drawing Sheet

Related U.S. Application Data

(60) Provisional application No. 61/556,731, filed on Nov. 7, 2011.

(51) Int. Cl.
*C01B 6/06* (2006.01)
*C25B 15/08* (2006.01)

(56) References Cited

U.S. PATENT DOCUMENTS

| | | |
|---|---|---|
| 3,184,528 A | 5/1965 | Norwalk et al. |
| 3,801,657 A | 4/1974 | Scruggs et al. |
| 3,801,707 A | 4/1974 | Ardis et al. |
| 3,810,974 A | 5/1974 | King et al. |
| 3,812,244 A | 5/1974 | Schmidt et al. |
| 3,816,192 A | 6/1974 | Brower et al. |
| 3,819,335 A | 6/1974 | Daniels et al. |
| 3,819,819 A | 6/1974 | Matzek et al. |
| 3,821,044 A | 6/1974 | Roberts et al. |
| 3,823,226 A | 7/1974 | Brower et al. |
| 3,826,820 A | 7/1974 | Roberts et al. |
| 3,838,194 A | 9/1974 | Reigler et al. |
| 3,838,195 A | 9/1974 | Reigler et al. |
| 3,840,654 A | 10/1974 | Schmidt et al. |
| 3,843,774 A | 10/1974 | York et al. |
| 3,850,709 A | 11/1974 | Schmidt |
| 3,857,930 A | 12/1974 | Kraus et al. |
| 3,869,544 A | 3/1975 | Niles et al. |
| 3,869,545 A | 3/1975 | Terada et al. |
| 3,883,644 A | 5/1975 | Matzek et al. |
| 4,006,095 A | 2/1977 | Hoffman et al. |
| 4,048,087 A | 9/1977 | Daniels et al. |
| 4,370,294 A | 1/1983 | Franken et al. |
| 4,395,219 A | 7/1983 | Franken et al. |
| 4,747,701 A | 5/1988 | Perkins |
| 5,292,387 A | 3/1994 | Highsmith et al. |
| 5,670,129 A | 9/1997 | Klapdor et al. |
| 5,730,952 A | 3/1998 | Rathman et al. |
| 6,228,338 B1 | 5/2001 | Petrie et al. |
| 6,617,064 B2 | 9/2003 | Petrie et al. |
| 7,238,336 B2 | 7/2007 | Lund et al. |
| 7,521,037 B1 | 4/2009 | Graetz et al. |
| 9,228,267 B1 | 1/2016 | Crouch-Baker |
| 9,327,974 B1 | 5/2016 | Petrie |
| 9,676,625 B1 | 6/2017 | Petrie et al. |
| 2001/0038821 A1 | 11/2001 | Petrie et al. |
| 2006/0249393 A1 | 11/2006 | Ghosh et al. |
| 2007/0056970 A1 | 3/2007 | Scherer et al. |
| 2007/0066839 A1 | 3/2007 | Lund et al. |
| 2008/0216906 A1 | 9/2008 | Curello et al. |
| 2009/0038954 A1 | 2/2009 | Zidan |
| 2009/0074631 A1 | 3/2009 | Longo |
| 2009/0291045 A1 | 11/2009 | Graetz et al. |
| 2010/0252444 A1 | 10/2010 | Vajo et al. |
| 2012/0017439 A1 | 1/2012 | Yamamoto et al. |
| 2012/0141363 A1 | 6/2012 | Zidan et al. |
| 2016/0297678 A1 | 10/2016 | Stout et al. |
| 2016/0368768 A1 | 12/2016 | Stout et al. |
| 2017/0275163 A1 | 9/2017 | Petrie et al. |
| 2018/0155195 A1 | 6/2018 | Stout et al. |

FOREIGN PATENT DOCUMENTS

| | | |
|---|---|---|
| GB | 2281059 A | 2/1995 |
| WO | WO2012018640 A1 | 2/2012 |

OTHER PUBLICATIONS

Finholt, A. E. et al., "Lithium Aluminum Hydride, Aluminum Hydride and Lithium Gallium Hydride and Some of Their Applications in Organic and Inorganic Chemistry," J. Am. Chem. Soc., 69:1199-1203, May 1947.

Rice Jr., M. J. et al., Contract ONR-494(04) ASTIA No. 106967, U.S. Office of Naval Research. 1956.

Tskhai, A. N. et al., "The Kinetics and a Mathematical Model of the Isothermal Crystallisation of Aluminum Hydride from Ether-Toluene Solutions," Russian Journal of Inorganic Chemistry, 37(8):877-885. 1992.

Brower, F. M. et al., "Preparation and Properties of Aluminum Hydride," Journal of the American Chemical Society, 98(9):2450-2453. Apr. 28, 1976.

Bulychev, B. M. et al. (1998), "Complex Compounds of Aluminum Hydride Ethoxide with Mixed Aluminum and Boron Hydrides of Lithium and Magnesium: Compositions, Physicochemical Properties, and Synthesis of Unsolvated Aluminum Hydride," Russian Journal of Inorganic Chemistry, 43(5):752-758 and 43:829.

Zakharov, V. V. et al. (1992), "The Thermal Transformations of Ether Addition Compounds of Aluminum Hydride," Russian Journal of Inorganic Chemistry, 37(9):997-1005.

International Search Report and Written Opinion dated Jan. 17, 2012 in Patent Cooperation Treaty Application No. PCT/US2011/045407, filed Jul. 26, 2011.

Krase et al., "Vapor Pressure of Toluene Up to the Critical Temperature," Industrial and Engineering Chemistry, Jan. 1930, p. 13.

Couper et al., "Process Control," in: Couper et al., "Chemical Process Equipment," Elsevier Inc., 2010, pp. 31-51.

USE OF FLUIDIZED-BED ELECTRODE REACTORS FOR ALANE PRODUCTION

CROSS REFERENCE TO RELATED APPLICATIONS

This non-provisional U.S. patent application is a continuation-in-part, and claims priority benefit of U.S. patent application Ser. No. 13/671,122, filed on Nov. 7, 2012, now U.S. Pat. No. 9,228,267, issued on Jan. 5, 2016, which in turn claims the priority benefit of U.S. provisional patent application Ser. No. 61/556,731, filed on Nov. 7, 2011. This application is also related to U.S. provisional patent application Ser. No. 61/556,722, filed on Nov. 7, 2011, U.S. patent application Ser. No. 09/334,359, filed on Jun. 16, 1999, now U.S. Pat. No. 6,228,338, issued on May 8, 2001, and U.S. patent application Ser. No. 09/823,379, filed on Mar. 29, 2001, now U.S. Pat. No. 6,617,064, issued on Sep. 9, 2003. All of the above are hereby incorporated by reference herein in their entirety.

GOVERNMENT LICENSE RIGHTS

This invention was made with government support under Contract No. DE-EE006629 awarded by the United States Department of Energy. The U.S. Government has certain rights in the invention.

FIELD OF THE INVENTION

The present technology may be generally described as system and methods for producing aluminum hydride using fluidized-bed electrode reactors.

BACKGROUND

Fluidized bed electrode reactors may utilize solid electrodes (e.g., anode and cathode) to facilitate decomposition of an electrolyte to produce various products. These fluidized bed reactors may include dry or liquid systems that fluidize a particulate electrolyte. An electrical potential difference is applied between the electrodes to decompose the electrolyte into one or more products.

SUMMARY OF THE PRESENT TECHNOLOGY

According to some embodiments, the present technology may be directed to a reactor that includes: (a) an aluminum anode, (b) a cathode, and (c) an electrolyte that comprises sodium aluminum hydride or lithium aluminum hydride dissolved in a solvent; and a generator for inducing an electric potential difference between the aluminum anode and the cathode to convert at least a portion of the electrolyte into an alane adduct.

According to some embodiments, the present technology may be directed to a method that includes inducing an electrical potential difference in an electrolyte solution to produce an anolyte solution that includes an alane adduct, wherein the an electrical potential difference is generated between anode aluminum particles and cathode particles, the electrolyte solution comprising sodium aluminum hydride dissolved in a solvent, the anode aluminum particles and cathode particles being separated by a diaphragm.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figures 1A, 1B:
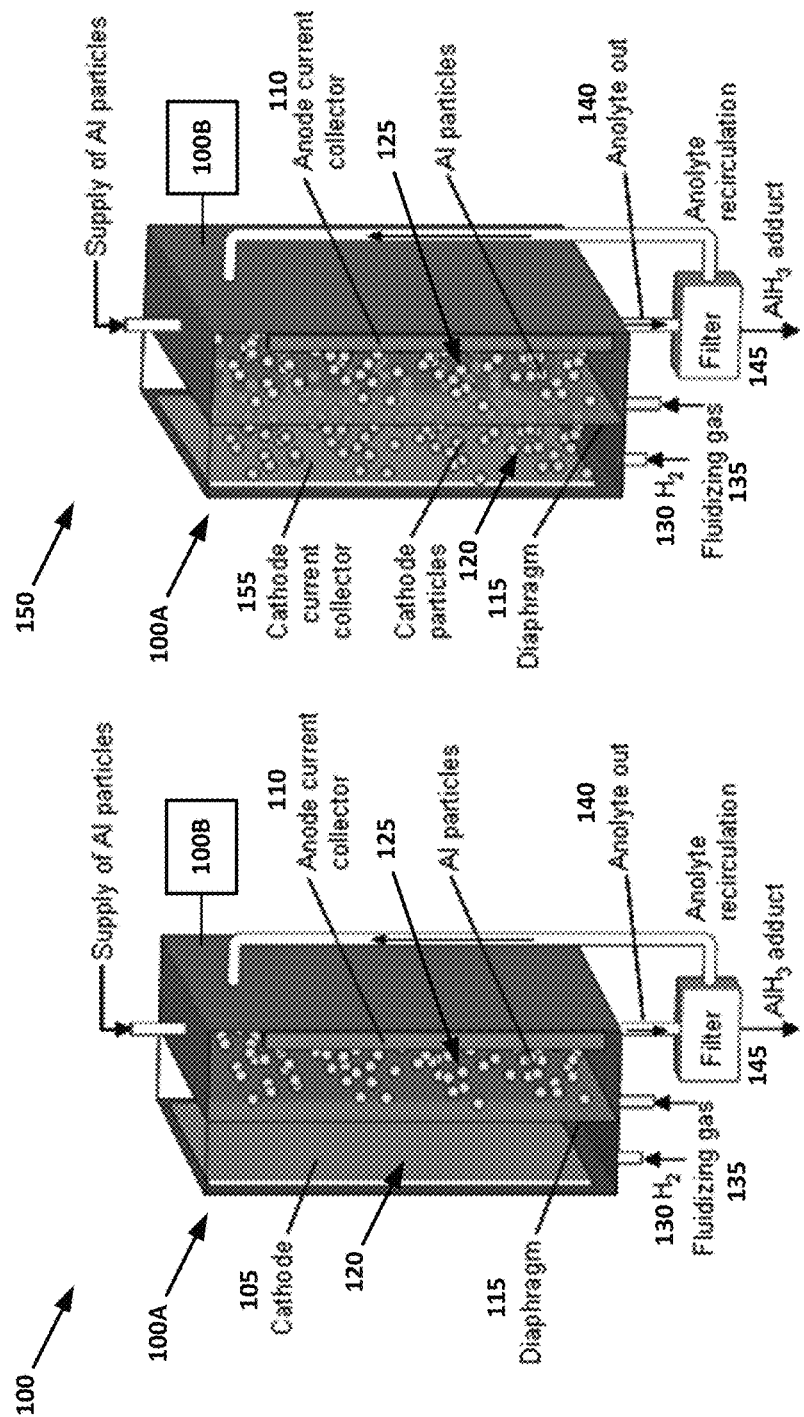
FIG. 1A is an exemplary fluidized bed reactor that uses electrochemical processes to produce alane.
FIG. 1B is another exemplary fluidized bed reactor that uses electrochemical processes to produce alane.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology describes methods and systems for production of alane via electrochemical processes. These electrochemical processes utilize aluminum anodes and cathodes to efficiently produce alane without the use of copious amounts of expensive solvents. More specifically, but not by way of limitation, the present technology may produce alane which can be converted into α-alane, which is a highly desirable alane polymorph that may be used in a variety of different industrial applications. This electrochemical process may allow for the production of alane without having to use the expensive feed stocks from the chemical process of producing alane.

Electrochemical cells (e.g., a reactor) of the present technology may provide for in situ regeneration of the alkali metal aluminum hydride electrolyte. The electrochemical cell includes both an aluminum anode and an aluminum cathode. The following electrochemical equation is illustrative of the regeneration of $NaAlH_4$ using the present technology:

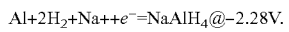

$$Al+2H_2+Na++e^-=NaAlH_4@-2.28V.$$

This process, combined with a first anode process, gives $Al+3/2H_2=AlH_3$ (alane) as the overall cell reaction, with no (or relatively low) net consumption of the alkali metal aluminum hydride electrolyte. Exemplary anode processes are described in greater detail below. Reducing consumption of the alkali metal aluminum hydride is advantageous due to reductions in material cost. In some instances, supplemental hydrogen may be provided at the cathode and at least a portion of the cathode and anode may be consumed. Thus, periodic replacement of the aluminum anode and/or aluminum cathode may be required, although the cost associated with aluminum is minor compared to the use of platinum-based cathodes. Advantageously, the replacement of a platinum cathode with an aluminum cathode not only reduces material costs, but also provides unique and unexpected benefits, namely regeneration of the alkali metal aluminum hydride.

Referring now to the drawings and in particular to FIG. 1A, which illustrates an exemplary fluidized bed reactor, hereinafter "reactor 100" is shown. The reactor 100 is shown as generally comprising a housing 100A, a cathode 105, an anode current collector 110, and a diaphragm 115 that separates the reactor 100 into a cathode chamber 120 and an anode chamber 125. The reactor 100 may also comprise an electrical potential difference generator 100B that produces an electric potential difference in the reactor 100. In exemplary embodiments, the anode current collector 110 may be an aluminum anode current collector.

According to some embodiments, the cathode 105 may comprise a sheet, mesh, rod, grate, grid, or slab of an anode material. In exemplary embodiments, the anode material may be a metallic material, such as aluminum. The cathode 105 may also be in the form of particles of varying shapes and sizes, including aluminum particles. The reactor 100 may also comprise a hydrogen inlet 130 used to introduce hydrogen gas into the cathode chamber 120. A fluidizing gas inlet 135 is also provided for introduction of fluidizing gas within the reactor 100.

According to some embodiments, the diaphragm 115 allows different electrolyte solutions to be employed in the anode and cathode chambers, for example by permitting only sodium (or lithium) ions to pass through the diaphragm. Other types of selective diaphragms may also be used in reactor 100.

An electrolyte comprised of $NaAlH_4$ or $LiAlH_4$ which has been dissolved into a donor tertiary amine such as N-alkylmorpholines or trialkylamines and/or a donor solvent molecule such as tetrahydrofuran, 2-methyltetrahydrofuran, dioxane, dimethoxyethane or diethyl ether, is placed into the reactor 100. When an electric potential difference is applied between the anode and cathode, an alane adduct produced by the decomposition of the $NaAlH_4$ or $LiAlH_4$ may form on the surface of the aluminum particles, and on the surface of the anode current collector 110. The solvent or amine may remove the alane from the aluminum particles and anode current collector 110 to create an anolyte mixture which includes an alane adduct. Anolyte may be removed from the reactor 100 via an anolyte outlet 140.

As the electrolyte solution is decomposed in the reactor 100 by application of the electrical potential difference between the cathode 105 and the anode current collector 110, free sodium (or lithium) ions, aluminum, and hydrogen molecules may form sodium (or lithium) aluminum hydride in the cathode chamber 120. When the reaction that decomposes the electrolyte in the anode chamber 125 is less than 100% efficient, the amount of free hydrogen gas may be insufficient to allow the regeneration of $NaAlH_4$ or $LiAlH_4$ in the cathode chamber 120. Thus, hydrogen gas may be introduced into the electrolyte through the hydrogen inlet 130, increasing the regeneration of the alkali metal aluminum hydride. In various exemplary embodiments, the alkali metal aluminum hydride can be $NaAlH_4$ or $LiAlH_4$.

According to some embodiments, electrolyte comprised of $NaAlH_4$ or $LiAlH_4$ which has been dissolved into a tertiary amine such as N-alkylmorpholines or trialkylamines and/or a donor solvent molecule such as tetrahydrofuran, 2-methyltetrahydrofuran, dioxane, dimethoxyethane or diethyl ether is placed into the anode chamber 125.

According to some embodiments, the reactor 100 may comprise a filter 145 which receives and filters the anolyte to remove alane adduct produced by the reactor 100 from solvents or other anolyte materials. Once the alane adduct has been filtered, the filter 145 may recirculate the filtered anolyte back into the reactor 100. Additionally, spent aluminum particles may be filtered from the anolyte solution and returned to the reactor 100.

FIG. 1B illustrates another exemplary reactor 150, which is constructed similarly to the reactor 100 of FIG. 1A, with the exception that the cathode 105 (e.g., the solid cathode current collector) has been replaced with a cathode current collector 155. Cathodic particles, such as conductive aluminum particles are dispersed throughout the cathode chamber 120 and are maintained in a state of agitation using a flowing electrolyte and/or a fluidizing gas. Electrical contact with the conductive cathode particles in the cathode chamber 120 may be maintained via the cathode current collector 155.

Advantageously, both reactors 100 and 150 utilize particulate electrodes, such as anode particles, cathode particles, or both. It is noteworthy that significant increase in reactive surface area is seen between solid electrodes and particulate electrodes. This increase in reactive surface area may overcome the inherent or intrinsically low reactive nature of solid aluminum electrodes, or any other electrode material for that matter. Stated otherwise, using particulate electrodes significantly improves reactivity of the electrode compared to the same material in solid form. Additionally, the increased surface area reduces the amount of overvoltage needed for the electrochemical reaction to occur.

When aluminum particles are used in the reactors, spent aluminum particles may be filtered from an anolyte solution created and recirculated into the reactor, creating, in some instances, a closed loop system, depending on the efficiency of the anode reactions occurring within the reactor. Since the spent aluminum is already in the form of a particle, which has a high surface area for reactions to occur, the spent aluminum particles may be re-used directly, without having to create an aluminum sheet or mesh cathode. This significantly reduces post-use process time and cost of the aluminum particles.

Regardless of the reactor configuration the following anode and cathode reactions may be used to produce alane adducts using an electrical potential difference. With regard to anode reactions, there are two alternate anode reaction processes that may occur within the anode chamber:

$$3NaAlH_4+Al=4AlH_3+3Na^++3e^-@-1.57V\ vs.SHE;\ or \quad (1)$$

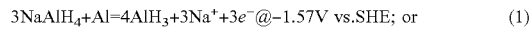

$$NaAlH_4=AlH_3+1/2H_2+Na^++e^-@-1.73V. \quad (2)$$

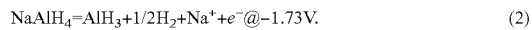

Both of these reactions occur over a similar electrical potential range and both of which proceed with the consumption of an electrolyte such as $NaAlH_4$. It is noteworthy that SHE refers to standard hydrogen electrode.

In the event that reaction (2) is produced, or that hydrogen is added, a putative cathode reaction may be facilitated within the cathode chamber:

$$Al+2H_2+Na^++e^-=NaAlH_4. \quad (3)$$

This allows for aluminum cathode particles to react with excess hydrogen and sodium ions in the presence of an electrical potential difference to produce $NaAlH_4$, which is the electrolyte used in the alternate anode reaction processes (1) and (2). Advantageously, in the highly efficient reaction (1), the electrolyte that is consumed at the anode is essentially replaced at the cathode resulting in no (or reduced) net consumption of materials other than aluminum and hydrogen, which are relatively inexpensive. Alternatively, to prevent loss of electrolyte reaction (2) may be supplemented by reaction (3) to facilitate regeneration of $NaAlH_4$.

Again, a solvent such as a tertiary amine such as N-alkylmorpholines or trialkylamines or a donor solvent molecule such as tetrahydrofuran, 2-methyltetrahydrofuran, dioxane, dimethoxyethane or diethyl ether captures alane produced on the surface of the aluminum anode particles and anode current collector 110. The soluble alane product produced by the reactors may be removed on a continuous or semi-continuous basis via closed-loop cycling of the liquid anolyte. The anolyte may consist of a solution of alane adduct dispersed throughout 2-methyltetrahydrofuran or trialkylamine, among others. The alane adduct may be converted into α-alane by removal of the excess solvent and thermal treatment of the solvent/alane adduct or a preformed trialkylamine alane adduct.

Exemplary methods for converting soluble alane derivatives into α-alane and other alane polymorphs are described in greater detail in U.S. Pat. No. 6,228,338, issued to Petrie et al. and U.S. Pat. No. 6,617,064, also issued to Petrie et al., all of which are hereby incorporated by reference herein including all references cited therein.

According to some embodiments, the aluminum of the cathode may be replaced with an alloy, which may include various combinations of aluminum and copper, nickel, and other suitable metals that would be known to one of ordinary skill in the art with the present disclosure before them.

Additionally, it will be understood that because the electric potential range used in the exemplary electrode reaction processes (1), (2) and (3) are negative, the reactors operate under reducing conditions. Because aluminum is prone to oxidation and passivation when exposed to oxidizing conditions, the negative potential used in the reactors reduces the passivation of the anode, keeping the anode substantially free from surface contamination, which reduces the reactivity of the aluminum. Furthermore, the voltage in the reactor may aid in the creation of a state similar to high pressure hydrogen in the fluidized bed reactor without actually needing to use high pressure hydrogen.

Additionally, using reducing conditions within the reactor in combination with an aluminum cathode and an aluminum anode produces unexpected results, including, but not limited to, the regeneration of the electrolyte material (for example, $NaAlH_4$) used in the anode reaction process.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A reactor, comprising:
   an aluminum anode, a cathode, and an electrolyte that comprises at least one alkali metal aluminum hydride dissolved in a solvent, the alkali metal aluminum hydride comprising at least one of sodium aluminum hydride and lithium aluminum hydride;
   a generator for inducing an electric potential difference between the aluminum anode and the cathode to convert at least a portion of the electrolyte into an alane adduct;
   a reactor housing; and
   a diaphragm disposed between the aluminum anode and the cathode, the diaphragm dividing the reactor housing into an anode chamber comprising aluminum particles and a cathode chamber.

2. The reactor according to claim 1, further comprising:
   an anode current collector disposed within the anode chamber and a cathode current collector disposed within the cathode chamber.

3. The reactor according to claim 2, wherein the cathode comprises aluminum particles.

4. The reactor according to claim 2, wherein the diaphragm only permits passage of alkali metal ions.

5. The reactor according to claim 2, further comprising a port for introducing a fluidizing gas into any of the anode chamber and the cathode chamber to fluidize the particles included therein.

6. The reactor according to claim 5, wherein the port is used to introduce hydrogen gas into the cathode chamber to facilitate regeneration of the alkali metal aluminum hydride within the cathode chamber.

7. The reactor according to claim 2, further comprising a filter in fluid communication with the reactor, the filter configured to filter the alane adduct from an anolyte solution and recirculate the filtered anolyte solution into the reactor.

8. The reactor according to claim 7, wherein the filter removes aluminum particles from the anolyte solution and recirculates the aluminum particles into any of the anode chamber and the cathode chamber.

9. The reactor according to claim 1, wherein the cathode comprises particles and the cathode is disposed within a cathode chamber comprising a cathode current collector.

10. The reactor according to claim 1, wherein the solvent comprises an amine.

11. The reactor according to claim 1, wherein the solvent is a donor solvent.

12. The reactor according to claim 11, wherein the solvent comprises tetrahydrofuran.

13. The reactor according to claim 11, wherein the solvent comprises an ether.

14. The reactor according to claim 1, wherein the alkali metal aluminum hydride is sodium aluminum hydride.

15. The reactor according to claim 1, wherein the alkali metal aluminum hydride is lithium aluminum hydride.

16. A method, comprising:
   inducing an electrical potential in an electrolyte solution to produce an anolyte solution that includes an alane adduct, wherein an electrical potential difference is generated between anode aluminum particles and cathode particles, the electrolyte solution comprising at least one of sodium aluminum hydride and lithium aluminum hydride dissolved in a solvent, the anode aluminum particles and the cathode particles being separated by a diaphragm.

17. The method according to claim 16, further comprising filtering the anolyte solution to remove the alane adduct.

18. The method according to claim 17, further comprising recirculating the filtered anolyte solution into the electrolyte solution.

19. The method according to claim 16, further comprising:
   recovering aluminum particles from the anolyte solution; and
   replacing at least one of the anode aluminum particles and the cathode particles with the recovered aluminum particles.

20. A method for reducing a functional group in a molecule, the method comprising:

reacting the molecule with a reducing agent comprising a hydride donor formed by inducing an electrical potential difference in an electrolyte solution to produce an anolyte solution that includes an alane adduct, the electrical potential difference being generated between anode aluminum particles and cathode particles, the electrolyte solution comprising at least one of sodium aluminum hydride and lithium aluminum hydride dissolved in a solvent, the anode aluminum particles and cathode particles being separated by a diaphragm.

* * * * *